(12) United States Patent
Que

(10) Patent No.: US 8,724,046 B2
(45) Date of Patent: May 13, 2014

(54) THIN LIQUID CRYSTAL DISPLAY DEVICE HAVING PARTICULAR CIRCUIT BOARDS MOUNTING STRUCTURE

(75) Inventor: ChengWen Que, Guangdong (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 171 days.

(21) Appl. No.: 13/509,987

(22) PCT Filed: Mar. 21, 2012

(86) PCT No.: PCT/CN2012/072683
§ 371 (c)(1),
(2), (4) Date: May 15, 2012

(87) PCT Pub. No.: WO2013/120303
PCT Pub. Date: Aug. 22, 2013

(65) Prior Publication Data
US 2013/0208211 A1    Aug. 15, 2013

(30) Foreign Application Priority Data

Feb. 15, 2012  (CN) .......................... 2012 1 0034072

(51) Int. Cl.
*G02F 1/1333* (2006.01)
*H02B 1/015* (2006.01)
*H02B 1/26* (2006.01)

(52) U.S. Cl.
USPC .............................. 349/58; 361/644; 361/657

(58) Field of Classification Search
CPC .......... G02F 1/13452; G02F 1/133608; G02F 1/133308; H02B 1/00; H02B 1/42; H02B 1/40; H02B 1/056; H01R 13/502
USPC ...................................... 349/58; 361/644, 657
See application file for complete search history.

(56) References Cited

U.S. PATENT DOCUMENTS

| 4,367,467 A * | 1/1983 | Emile, Jr. ........................ 349/57 |
| 6,020,867 A * | 2/2000 | Shimada et al. ................ 345/87 |
| 2001/0005240 A1* | 6/2001 | Takeishi .......................... 349/58 |

FOREIGN PATENT DOCUMENTS

CN         102122947 A       7/2011

* cited by examiner

*Primary Examiner* — Mike Qi
(74) *Attorney, Agent, or Firm* — Cheng-Ju Chiang

(57) ABSTRACT

The present invention provides a thin liquid crystal display device including a body, a mounting seat mounted to the body, a mounting frame arranged inside the mounting seat, a plurality of circuit boards mounted to the mounting frame and electrically connected to the body, and a cover plate covering the mounting seat. The thin liquid crystal display device of the present invention provides a mounting seat that is mounted to a front shell and located at one side of the body of the liquid crystal display device. The mounting seat receives and retains therein the mounting frame for mounting a plurality of PCBs so that the amount of space required for mounting the PCBs is reduced and overall thinning of the liquid crystal display device is facilitated.

10 Claims, 5 Drawing Sheets

THIN LIQUID CRYSTAL DISPLAY DEVICE HAVING PARTICULAR CIRCUIT BOARDS MOUNTING STRUCTURE

BACKGROUND OF THE INVENTION

1. Field of the Invention

The present invention relates to the field of liquid crystal displaying, and in particular to a thin liquid crystal display device.

2. The Related Arts

Liquid crystal display (LCD) has a variety of advantages, such as small device thickness, low power consumption, and being free of radiation, and is thus widely used.

As shown in FIG. 1, a conventional liquid crystal display device generally comprises a casing 100, a liquid crystal display module 200 arranged inside the casing 100, and a plurality of printed circuit boards (PCBs) 300 arranged inside the casing 100. The casing 100 comprises a front shell 101 and a rear shell (not shown) that mate each other. The liquid crystal display module 200 is mounted to the front shell 101. The plurality of PCBs 300 comprises a liquid crystal driving control PCB 301, a frequency conversion control PCB 302, and an analog-to-digital (A/D) conversion PCB 303, which are arranged behind the liquid crystal display module 200 and located inside the rear shell. When maintenance of the PCBs 300 is desired, the rear shell is first detached and then the maintenance operation can be performed. The process of detaching and mounting is complicated and is thus not easy to handle. Further, the PCBs 300 are arranged behind the liquid crystal display module 200 so that the overall thickness of the liquid crystal display device is increased, this being adverse to the progress of thinning liquid crystal display device.

In view of the above problems, proposals have been made to use function integrated PCBs, which are mounted at one side of the display device in order to reduce the thickness of the display device, as shown in FIG. 2. The integrated PCBs 600 of such a known liquid crystal display device are arranged, in an inclined fashion, at one side of the liquid crystal display device. Although this can reduce the thickness of the display device to some extents, yet the integrated PCBs are of high cost, making it adverse to cost control.

SUMMARY OF THE INVENTION

An object of the present invention is to provide a thin liquid crystal display device, which arranges a plurality of PCBs in a stacked form to be disposed in a mounting frame that is set at one side of the body of the liquid crystal display device in order to facilitate thinning of the device, easy maintenance, and low cost.

To achieve the object, the present invention provides a thin liquid crystal display device, which comprises: a body, a mounting seat mounted to the body, a mounting frame arranged inside the mounting seat, a plurality of printed circuit boards (PCBs) mounted to the mounting frame and electrically connected to the body, and a cover plate covering the mounting seat.

The body comprises a front shell, and the mounting seat is mounted to the front shell.

The mounting seat is integrally formed with the front shell.

The mounting seat comprises a carrier plate and side plates connected to opposite ends of the carrier plate. The carrier plate and the side plates collectively define a receiving chamber. The mounting frame is received in the receiving chamber.

The mounting seat and the body form an opening therebetween and the cover plate covers the opening.

The mounting frame forms a plurality of mounting troughs and the PCBs are respectively mounted inside the mounting troughs.

The PCBs comprises a liquid crystal driving control PCB, a frequency conversion control PCB, and an analog-to-digital (A/D) conversion PCB.

The mounting troughs formed in the mounting frame are arranged in a stepwise configuration and the mounting troughs comprise, in sequence, a first trough, a second trough, and a third trough. The first trough, the second trough, and the third trough are arranged sequentially from small size to large size. The liquid crystal driving control PCB, the frequency conversion control PCB, and the A/D conversion PCB are arranged sequentially from small size to large size. The liquid crystal driving control PCB is mounted inside the first trough. The frequency conversion control PCB is mounted inside the second trough. The A/D conversion PCB is mounted inside the third trough. The liquid crystal driving control PCB, the frequency conversion control PCB, and the A/D conversion PCB are respectively fixed inside the first, second, and third troughs by snap-on or screwing The mounting frame is mounted inside the mounting seat through snap-on, adhesives, or screwing.

The body further comprises a rear shell that is arranged to mate the front shell and a liquid crystal display module is arranged between the front shell and the rear shell.

The efficacy of the present invention is that: the present invention provides a thin liquid crystal display device by providing mounting seat that is mounted to the front shell and located at one side of the body of a liquid crystal display device. The mounting seat receives and retains therein a mounting frame for mounting a plurality of PCBs so that the amount of space required for mounting the PCBs is reduced and overall thinning of the liquid crystal display device is facilitated. Further, a mounting seat cover plate that is separate from the rear shell of the body is provided so that maintenance of the PCBs can be performed by simply removing the cover plate without detaching the rear shell. The operation is easy. The cover plate is arranged to completely cover the opening between the mounting seat and the body to effect dust protection and at the same time maintain overall integrity of outside appearance of the liquid crystal display device.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
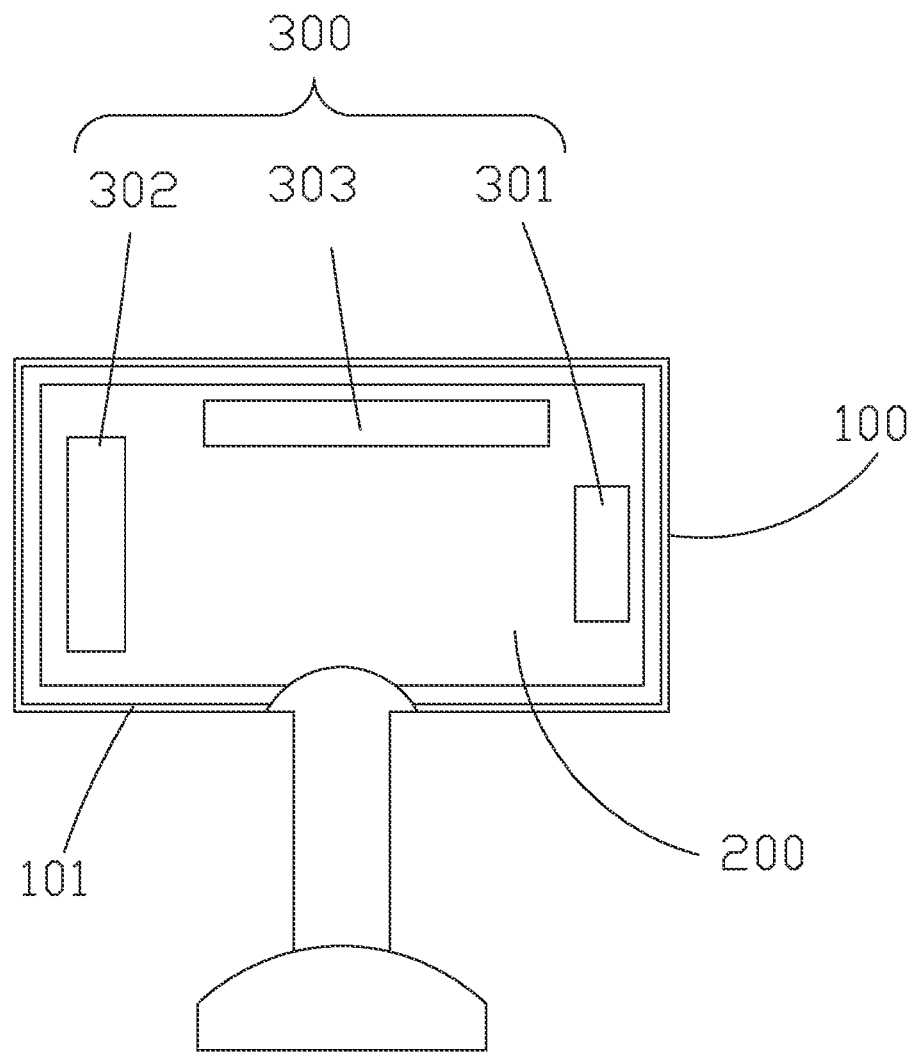
FIG. 1 is a schematic view showing a conventional liquid crystal display device.
Figure 2:
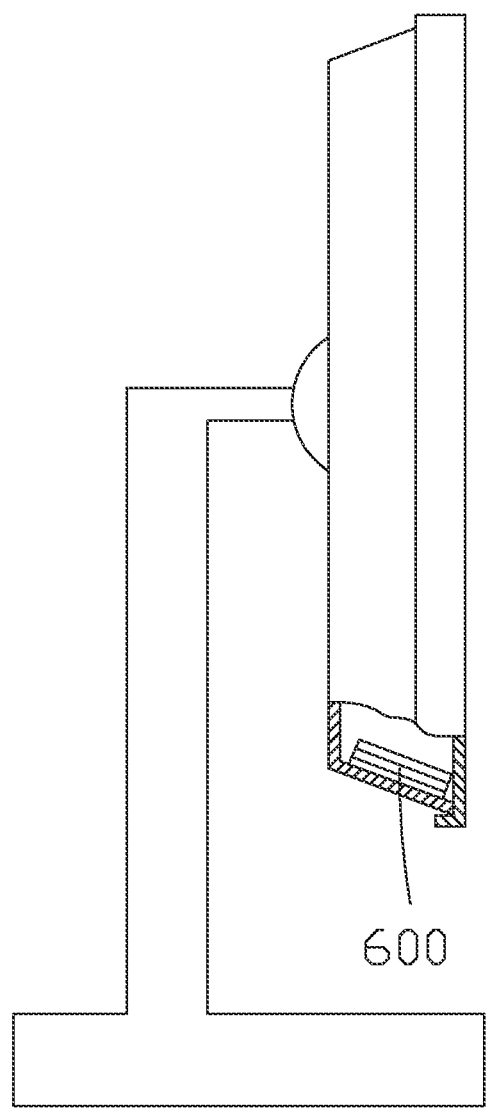
FIG. 2 is a schematic view showing another conventional liquid crystal display device.
Figure 3:
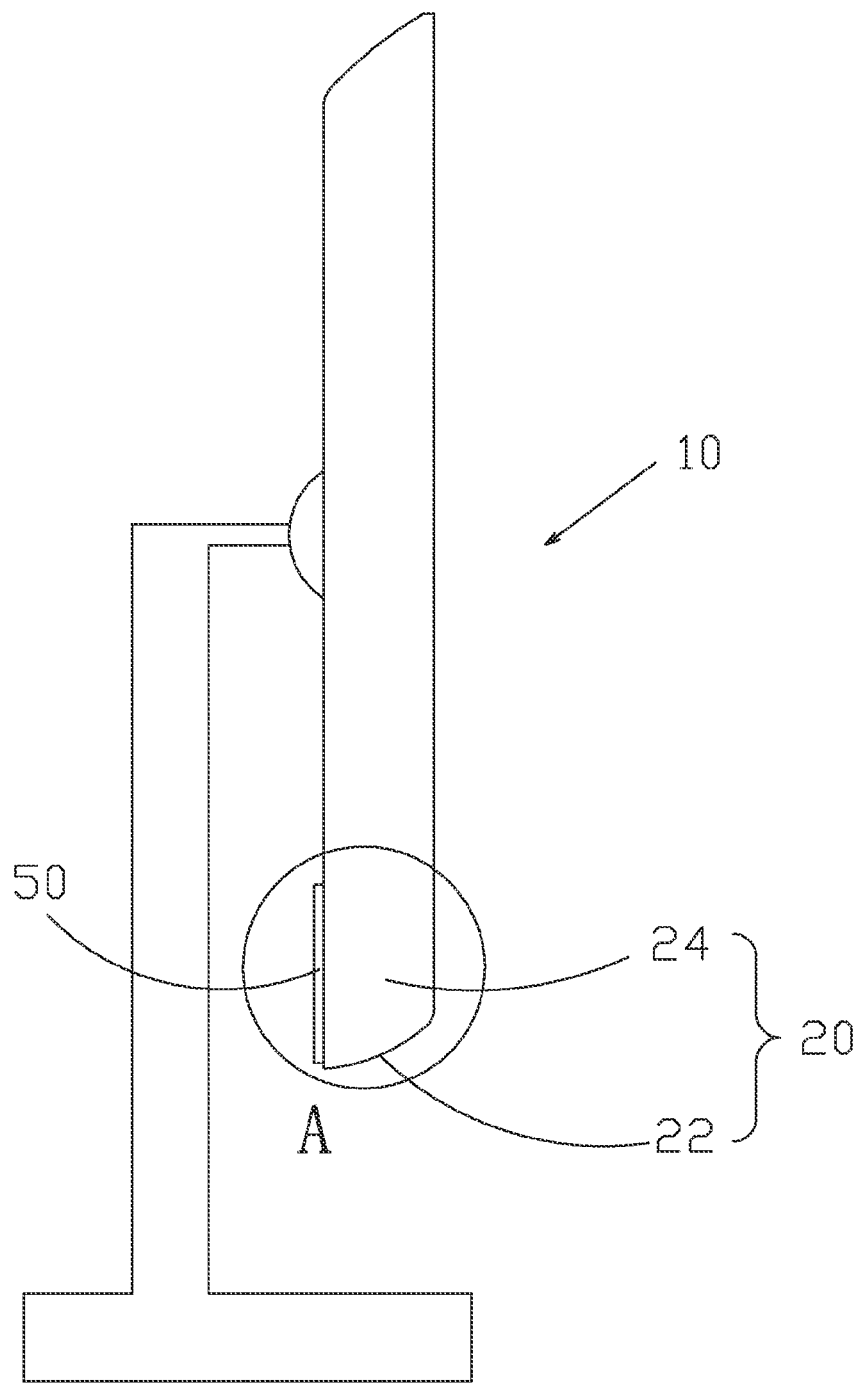
FIG. 3 is a schematic side elevational view showing a thin liquid crystal display device according to the present invention.
Figure 4:
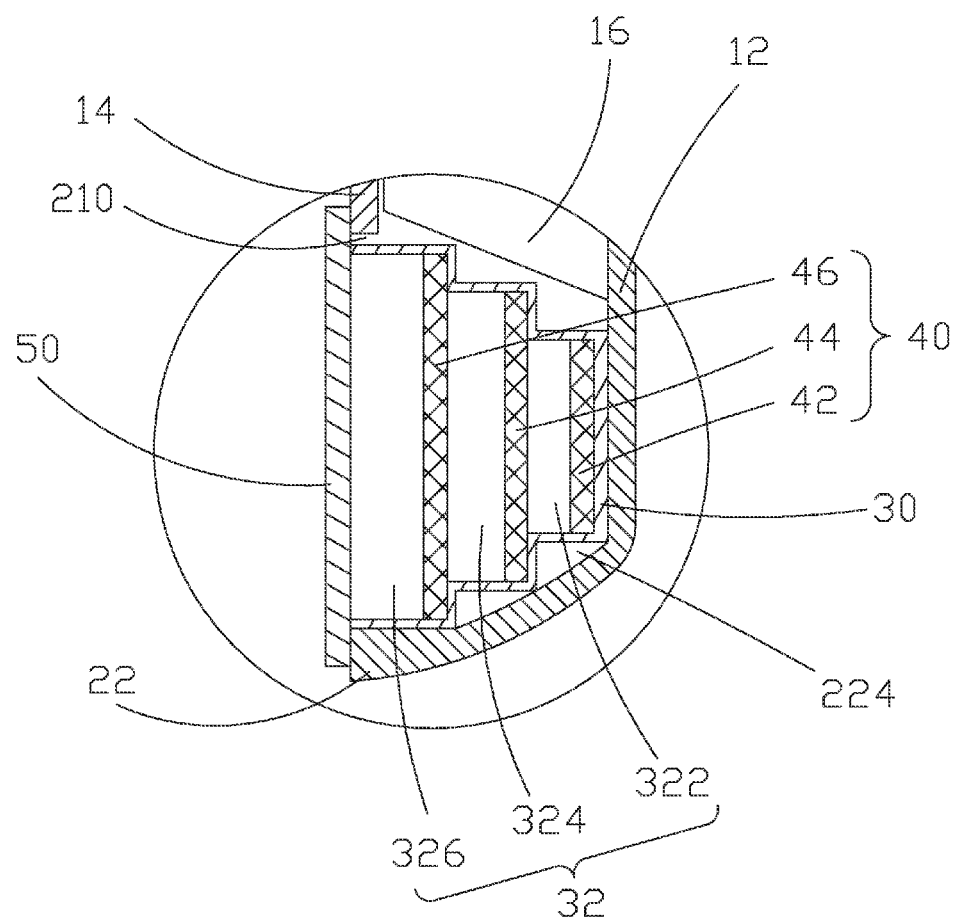
FIG. 4 is a cross-sectional view of circled portion A of FIG. 3.
Figure 5:
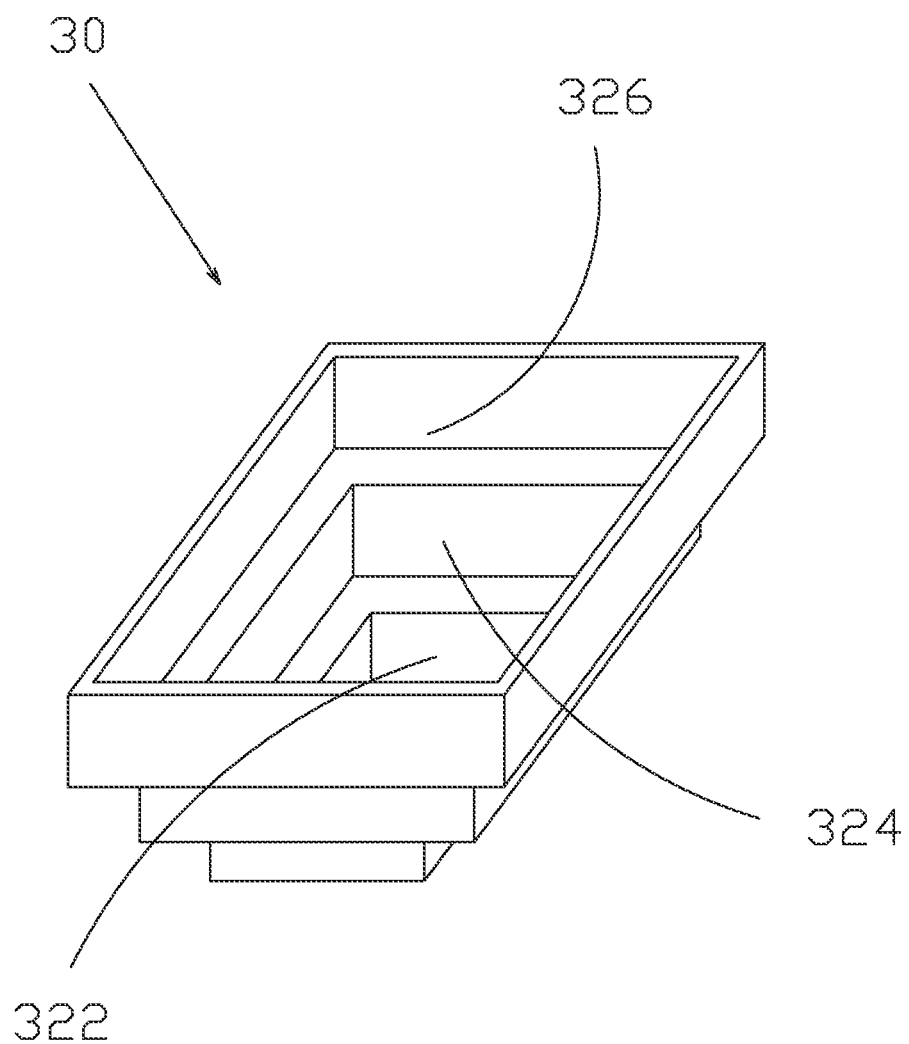
FIG. 5 is a perspective view showing a mounting frame of the thin liquid crystal display device according to the present invention.

Referring to FIGS. 3-5, the present invention provides a thin liquid crystal display device, which comprises: a body 10, a mounting seat 20 mounted to the body 10, a mounting frame 30 arranged inside the mounting seat 20, a plurality of printed circuit boards (PCBs) 40 mounted to the mounting frame 30 and electrically connected to the body 10, and a cover plate 50 covering the mounting seat 20.

The body 10 comprises a front shell 12, a rear shell 14 that is arranged to mate the front shell 12, and a liquid crystal display module 16 arranged between the front shell 12 and the rear shell 14.

The mounting seat 20 is mounted to the front shell 12 of the body 10 and forms an opening 210 with respect to the body 10. The mounting seat 20 is integrally formed with the front shell 12 and comprises a carrier plate 22 and side plates 24 connected to opposite ends of the carrier plate 22. The carrier plate 22 and the side plates 24 collectively define a receiving chamber 224 and the mounting frame 30 is received in the receiving chamber 224. The mounting seat 20 can be arranged at any location of the upper, lower, left, and right portions of the body 10 and is preferably mounted to the lower portion of the body 10 in order to remove the problem that the overall thickness of liquid crystal display device cannot be further reduced due to all the PCBs 40 of a conventional device being mounted inside the body 10 behind the liquid crystal display module 16 and to facilitate overall thinning of the liquid crystal display device.

The mounting frame 30 is mounted inside the mounting seat 20 through for example, snap-on, adhesives, or screwing. The mounting frame 30 forms a plurality of mounting troughs 32, and the PCBs 40 are respectively mounted inside the mounting troughs 32. The mounting troughs 32 are arranged in a stepwise configuration and include, in sequence, a first trough 322, a second trough 324, and a third trough 326.

The plurality of PCBs 40 comprises a liquid crystal driving control PCB 42, a frequency conversion control PCB 44, and an analog-to-digital (ND) conversion PCB 46.

The cover plate 50 covers the opening 210 between the mounting seat 20 and the body 10 in order to prevent dusts from falling onto the PCBs and thus prevent the dusts from causing shorting.

The cover plate 50 is mounted to the rear shell 14 and the mounting seat 20 of the body 10 through for example snap-on or screwing to completely cover the opening 210 so as to ensure overall aesthetics of the liquid crystal display device. Since the cover plate 50 and the rear shell 14 are of a separate design, inspection and maintenance of the liquid crystal driving control PCB 42, the frequency conversion control PCB 44, and the ND conversion PCB 46 mounted inside the mounting frame 30 can be performed by opening the cover plate 50, making the maintenance operation of the PCBs 40 easy and convenient.

In a preferred embodiment, the liquid crystal driving control PCB 42, the frequency conversion control PCB 44, and the A/D conversion PCB 46 are of sizes that increase sequentially from small one to large one. The sizes of the first trough 322, the second trough 324, and the third trough 326 are also arranged sequentially from small one to large one to correspond to the sizes of the liquid crystal driving control PCB 42, the frequency conversion control PCB 44, and the A/D conversion PCB 46, whereby the liquid crystal driving control PCB 42 is mounted in the first trough 322, the frequency conversion control PCB 44 is mounted in the second trough 324, and the A/D conversion PCB 46 is mounted in the third trough 326, and all are spaced from each other by a safe distance. The liquid crystal driving control PCB 42, the frequency conversion control PCB 44, and the A/D conversion PCB 46 are respectively mounted inside the first, second, and third troughs 322, 324, 326 through for example snap-on, screwing, or other detachable coupling means. The PCBs 40 are arranged in stacked fashion inside the mounting frame 30, so that the amount of space required for mounting the PCBs is reduced and overall thinning of the liquid crystal display device is facilitated. Thus, the problem that the overall thickness of liquid crystal display device cannot be further reduced due to all the PCBs 40 of a conventional device being mounted inside the body 10 behind the liquid crystal display module 16 so that overall thinning of the liquid crystal display device is facilitated and the high cost problem of using function integrated PCBs is also overcome.

In summary, the present invention provides a thin liquid crystal display device by providing mounting seat that is mounted to the front shell and located at one side of the body of a liquid crystal display device. The mounting seat receives and retains therein a mounting frame for mounting a plurality of PCBs so that the amount of space required for mounting the PCBs is reduced and overall thinning of the liquid crystal display device is facilitated. Further, a mounting seat cover plate that is separate from the rear shell of the body is provided so that maintenance of the PCBs can be performed by simply removing the cover plate without detaching the rear shell. The operation is easy. The cover plate is arranged to completely cover the opening between the mounting seat and the body to effect dust protection and at the same time maintain overall integrity of outside appearance of the liquid crystal display device.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A thin liquid crystal display device, comprising: a body, a mounting seat mounted to the body, a mounting frame arranged inside the mounting seat, a plurality of circuit boards mounted to the mounting frame and electrically connected to the body, and a cover plate covering the mounting seat.

2. The thin liquid crystal display device as claimed in claim 1, wherein the body comprises a front shell, the mounting seat being mounted to the front shell.

3. The thin liquid crystal display device as claimed in claim 2, wherein the mounting seat is integrally formed with the front shell.

4. The thin liquid crystal display device as claimed in claim 2, wherein the mounting seat comprise a carrier plate and side plates connected to opposite ends of the carrier plate, the carrier plate and the side plates collectively defining a receiving chamber, the mounting frame being received in the receiving chamber.

5. The thin liquid crystal display device as claimed in claim 4, wherein the mounting seat and the body form an opening therebetween and the cover plate covers the opening.

6. The thin liquid crystal display device as claimed in claim 2, wherein the body comprises a rear shell that is arranged to mate the front shell and a liquid crystal display module arranged between the front shell and the rear shell.

7. The thin liquid crystal display device as claimed in claim 1, wherein the mounting frame forms a plurality of mounting troughs, the circuit boards being respectively mounted inside the mounting troughs.

8. The thin liquid crystal display device as claimed in claim 7, wherein the circuit boards comprise a liquid crystal driving control circuit board, a frequency conversion control circuit board, and an analog-to-digital conversion circuit board.

9. The thin liquid crystal display device as claimed in claim 8, wherein the mounting troughs of the mounting frame are arranged in a stepwise configuration and the mounting troughs comprise, in sequence, a first trough, a second trough, and a third trough, the first trough, the second trough, and the third trough being arranged sequentially from small size to large size, the liquid crystal driving control circuit board, the frequency conversion control circuit board, and the analog-to-digital conversion circuit board being arranged sequentially from small size to large size, the liquid crystal driving control circuit board being mounted inside the first trough, the frequency conversion control circuit board being mounted inside the second trough, the analog-to-digital conversion circuit board being mounted inside the third trough, the liquid crystal driving control circuit board, the frequency conversion control circuit board, and the analog-to-digital conversion circuit board being respectively fixed inside the first, second, and third troughs by snap-on or screwing.

10. The thin liquid crystal display device as claimed in claim 1, wherein the mounting frame is mounted inside the mounting seat through snap-on, adhesives, or screwing.

* * * * *